Sept. 13, 1966    L. A. SABRSULA    3,271,892
SINKER FOR FISHING LINES
Filed July 13, 1964

INVENTOR
LOUIS A. SABRSULA
By *Kurt H...*

United States Patent Office 3,271,892
Patented Sept. 13, 1966

3,271,892
SINKER FOR FISHING LINES
Louis A. Sabrsula, 274 Concord St.,
San Francisco 12, Calif.
Filed July 13, 1964, Ser. No. 382,249
4 Claims. (Cl. 43—42.03)

The present invention relates to the devices employed to maintain fishing lures and hooks in submerged condition.

To lower a lure and a hook to a desired depth and to maintain them in submerged condition, a weight known as a "sinker" is usually tied to the line. However, when a lure or hook is trolled by a boat or encounters strong undercurrents, it has a tendency to rise to the surface unless the weight of the sinker is very large.

It is an object of my invention to provide a device for use in connection with fishing lines that will dependably maintain a lure or hook in submerged condition even though they may be trolled or may encounter heavy undercurrents.

Another object of the invention is to provide a device of the type referred to, that will not rise to the surface nor flip over during use irrespective of heavy undercurrents and changes in the direction and strength of such undercurrents and/or changes in the speed and/or direction of travel of the trolling boat.

Figure 1:
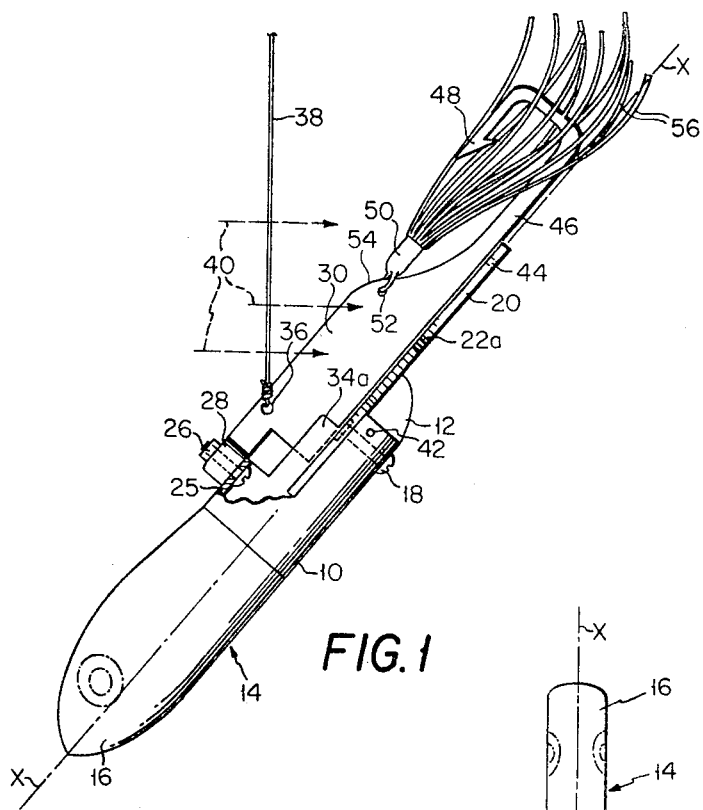
Figure 2:
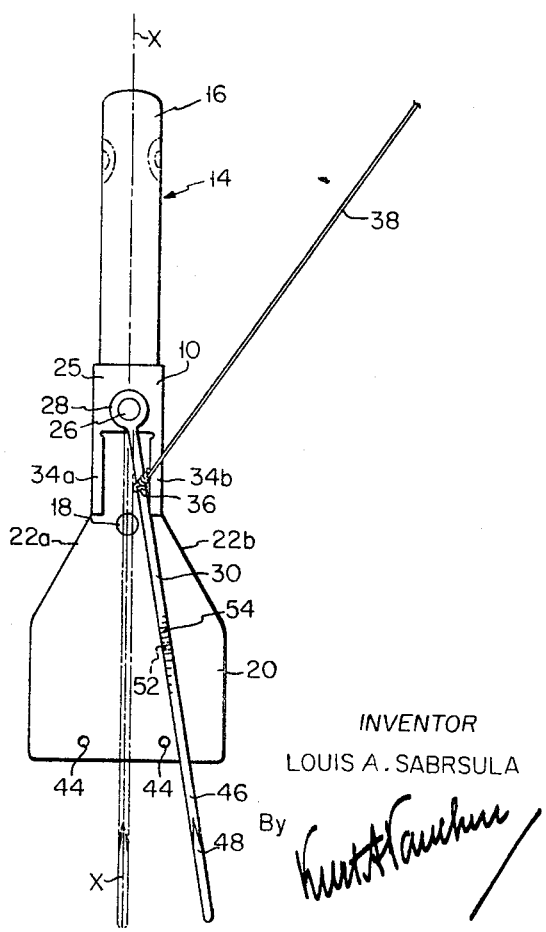

These and other objects of my invention will be apparent from the following description of the accompanying drawing which illustrates a preferred embodiment thereof, and wherein FIGURE 1 is a fragmentary perspective of the device of the present invention; and FIGURE 2 is a plan view of the device.

The device of my invention comprises a tubular frame 10, and received in said frame and suitably bolted to the bottom sector thereof is the tongue-shaped extension 12 of a bar-shaped body 14 of heavy material, such as lead, that has a tapering front end 16 and may be formed to resemble the body of a fish (FIGURE 1). Secured to the top surface of extension 12 by the same bolt 18 which secures said extension to the frame 10, is a tail plate 20 whose rearwardly diverging side edges 22a and 22b (FIGURE 2) emerge from the interior of the tubular frame through laterally located slots in the sides of said frame. Mounted in the top sector 25 of said tubular frame 10 is a hinge or pivot pin 26 which is rotatably engaged by a loop 28 formed on the inner end of an elongated rudder 30. Said rudder is disposed in a plane perpendicular to the plane of the tail plate 20, with its bottom edge located directly above the upper surface of tail plate 20. The extent to which it may depart from its center position is confined by limit stops established by side wall segments 34a and 34b of the tubular frame 10 (FIGURE 2). Attached to the rudder near the upper edge thereof through an aperture 36 a limited distance removed from its loop 28 is the fishing line 38. Since the main weight of the described structure is supplied by the front portion 16 of the body 14, the fishing line 38 suspends the device at a point axially removed from its center of gravity in the direction of its tail end, and as a result thereof the device, when freely suspended at point 36 of rudder 30 assumes always the steeply titled position illustrated in FIGURE 1 wherein its nose 16 points downwardly and its tail slants upwardly.

When a conventional sinker is trolled behind a boat, the force of the water impinging upon its leading surface segment causes it to slant backwardly with its suspended end pointing obliquely upwardly toward the boat. This will eventually bring the sinker to the surface. When the device of the invention is trolled, however, and/or encounters strong undercurrents, the force of the water acts mainly upon the extended tail 20 at its rear end as indicated by the arrows 40 in FIGURE 1. This causes it to swing in a clockwise direction as viewed in FIGURE 1 and assume an almost horizontal position wherein its axis of symmetry $x$—$x$ lies in a plane containing the path of movement of the boat but unless the boat travels at excessive speeds its nose is still tilted slightly downwardly downwardly and does not point to the boat itself. In this position the sinker arrangement will follow the pull of the boat and/or face undercurrents without loss of depth.

When trolled sinker arrangements of conventional construction encounter strong cross currents, they drift laterally away from the course of the boat in a manner which again may ultimately bring them to the surface of the water or may even cause them to flip over. The device of the invention comprises means in the form of the described freely rotatable rudder arrangement that sets it at all times automatically to a position wherein the axis of the device lies in a plane containing the path of advance of the vessel. In this position it will not tilt or flip over irrespective of whether the speed and/or the direction of travel of the boat and/or the direction and/or the strength of the cross currents vary. As long as the device of the invention travels directly behind the trolling boat with the fishing line 38 located in the vertical plane of symmetry of the device (FIGURE 2), the rudder 30 is located in the same plane and remains without effect upon the course and position of the device. However, when a cross current causes the device to drift off laterally from the course of the boat, say in a direction toward the left of the path of advance of the boat, the pull of the line 38 swings the rudder 20 in a counterclockwise direction as viewed in FIGURE 2 from the position shown in broken lines to the position shown in solid lines. In the new position the force of the water impinging upon the outer surface of the rudder swings the total device in a clockwise direction until its axis lies in a plane that contains the path of advance of the trolling vessel. At the same time the tail plate 20 prevents any upward tilt of the device. Therefore, no matter how much or how little the device of the invention drifts laterally away from the course of the trolling vessel under the influence of a cross current, or vice versa no matter in which direction and to which degree the trolling vessel may change its course, the device of the invention will not flip over and improper ascent of the device to the surface is prevented. In practice I have found that as the device is automatically steered into a plane containing the path of advance of the trolling vessel by the described operation of the rudder, it tends to overreach its destination causing departure of the rudder from the plane of symmetry of the device in an opposite direction. As a result thereof, the device of the invention may oscillate behind the trolling vessel and thus perform in a manner that strikingly resembles a live fish.

Means may be provided in the form of an aperture 42 in the frame 10 (FIGURE 1) or apertures 44 (FIGURE 2) in the tail plate 20 near the rear edge thereof for attaching a hook, or a lure and a hook, to the device of the invention. In the preferred embodiment of the invention the rear end of the rudder 20 is provided with an elongated extension 46 of diminishing depth that is bent into a barbed hook 48, and an eye 50 is engaged in an aperture 52 adjacent the rear edge 54 of the rudder for attaching a suitable lure 56. Alternatively, a line supporting a lure and/or a hook may be attached to the rudder by means of the same aperture 36, by which the fishing line 38 is attached to the rudder. If the device of the invention is employed to catch large fish, the body portion 14, the frame 10 and the tail plate 20 may be painted to resemble a fish as shown in FIGURE 1, so that no other lure is required.

While I have described my invention with the aid of a particular embodiment thereof, it will be understood that the invention is not limited to the specific constructional details shown and described by way of example, which may be departed from without departing from the scope and spirit of the invention.

I claim:

1. A sinker arrangement for fishing lines comprising a bar-shaped body of heavy material and having a tapering front end and a rear end, a tail plate rigidly secured to said body at said rear end thereof, a rudder plate disposed at right angles to said tail plate, means for supporting said rudder plate at said rear end for free rotation along a plane parallel and adjacent to said tail plate about an axis extending perpendicular to said tail plate and removed from the center of gravity of said body, and means for attaching a fishing line to said rudder at a point removed from its axis of rotation.

2. A sinker arrangement for fishing lines comprising a bar-shaped body of heavy material, a tail plate rigidly secured to said body at one end thereof, a rudder plate disposed at right angles to said tail plate, means for supporting said rudder plate from said body for free rotation along a plane parallel to said tail plate about an axis extending perpendicular to the plane defined by said tail plate, and means for attaching a fishing line to said rudder plate at a point rearwardly removed from said axis, said rudder having its free rear end portion bent into a hook.

3. A sinker arrangement for fishing lines comprising a bar-shaped body of heavy material having a front and a rear end, a rearwardly diverging tail plate rigidly secured to said bar at said rear end thereof, an elongated rudder plate disposed at right angles to said tail plate, means for supporting said rudder plate from the rear end of said body for free rotation along a plane adjacent and parallel to said tail plate about an axis extending perpendicular to said tail plate and rearwardly removed from the center of gravity of said body, means for attaching a fishing line to said rudder at a point adjacent its free longitudinal edge and rearwardly removed from its axis of rotation, the free rear end portion of said rudder being of diminishing depth and bent into a hook, and means at the rear end of said rudder for attaching a lure thereto.

4. A sinker arrangement comprising a tubular frame, a bar-shaped body of heavy material having a tapered front end and a rear end, said rear end being received in and secured to said frame, a rearwardly diverging tail plate rigidly supported from said frame rearwardly of said body, an elongated rudder plate disposed at right angles to said tail plate, pivot means for supporting said rudder plate rearwardly of said bar for rotation along a plane parallel and adjacent to said tail plate about an axis extending perpendicular to the plane defined by said tail plate and removed from the center of gravity of said body, limit stop means formed by said frame at either side of said rudder plate for confining rotational departure of said rudder plate from the plane of symmetry of said tail plate, means for attaching a fishing line to said rudder plate at a point adjacent its free longitudinal edge and rearwardly removed from its axis of rotation, the free rear end of said rudder plate being of diminishing depth and bent into a hook, and means for attaching a lure to the free rear end of said rudder.

References Cited by the Examiner

UNITED STATES PATENTS 2,976,642 3/1961 Wickman et al. ___ 43—42.23 X
2,977,709 3/1961 Keiter _____ 43—43.13
3,180,050 4/1965 Shoemaker _____ 43—42.03

ABRAHAM G. STONE, *Primary Examiner.*

R. L. HOLLISTER, *Assistant Examiner.*